United States Patent
Gielisch et al.

(10) Patent No.: US 10,434,825 B2
(45) Date of Patent: Oct. 8, 2019

(54) ASSEMBLY AND METHOD FOR THE COMPRESSED AIR SUPPLY OF A WHEEL OF A VEHICLE

(71) Applicant: Bayerische Motoren Werke Aktiengesellschaft, Munich (DE)

(72) Inventors: Sebastian Gielisch, Unterschleissheim (DE); Stefan Stuerzl, Garching (DE); Johann Dudkowiak, Poecking (DE); Thomas Janek, Iserlohn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 15/476,358

(22) Filed: Mar. 31, 2017

(65) Prior Publication Data

US 2017/0203618 A1 Jul. 20, 2017

Related U.S. Application Data

(63) Continuation of application No. PCT/EP2015/069944, filed on Sep. 1, 2015.

(30) Foreign Application Priority Data

| Oct. 1, 2014 | (DE) | 10 2014 219 980 |
| Oct. 1, 2014 | (DE) | 10 2014 219 981 |
| Oct. 1, 2014 | (DE) | 10 2014 219 983 |

(51) Int. Cl.
*B60C 23/00* (2006.01)
*B60B 27/00* (2006.01)

(52) U.S. Cl.
CPC ........ *B60C 23/003* (2013.01); *B60B 27/0047* (2013.01); *B60B 27/0005* (2013.01)

(58) Field of Classification Search
CPC .............. B60C 23/003; B60C 23/0021; B60C 23/0026; B60C 23/0031; B60C 23/0047;
(Continued)

(56) References Cited

U.S. PATENT DOCUMENTS 3,705,614 A * 12/1972 Juttner .................. B60C 23/003
152/417
4,460,058 A * 7/1984 Welschof ............ B60B 27/0005
180/258

(Continued)

FOREIGN PATENT DOCUMENTS

| CN | 101863199 A | 10/2010 |
| CN | 103328234 A | 9/2013 |

(Continued)

OTHER PUBLICATIONS

German-language Search Report issued in counterpart German Application No. 10 2014 219 980.8 dated Jul. 29, 2015 with partial English translation (10 pages).
(Continued)

*Primary Examiner* — Kip T Kotter
(74) *Attorney, Agent, or Firm* — Crowell & Moring LLP

(57) ABSTRACT

An assembly supplies compressed air to a wheel of a vehicle. The assembly includes a wheel with a tire, a drive shaft for transmitting torque to the wheel, a wheel bearing on which the wheel in mounted in a rotationally fixed manner, and a toothing between the drive shaft and the wheel bearing. The wheel bearing is tensioned with the drive shaft by a bolt, wherein the bolt is arranged coaxially in relation to the drive shaft. An annular chamber of the wheel bearing is defined inside the wheel bearing and radially outside of the bolt. A compressed air through-opening is provided from the annular chamber of the wheel bearing in the direction of the wheel. A compressed air guide, leads from a compressed air source on the vehicle side into the annular chamber of the
(Continued)

wheel bearing, from the annular chamber of the wheel bearing via the at least one compressed air through-opening to the wheel, and from the wheel into the tire.

18 Claims, 10 Drawing Sheets

(58) Field of Classification Search
 CPC ............ B60B 27/0021; B60B 27/0026; B60B 27/0031; B60B 27/0047
 See application file for complete search history.

(56) References Cited

U.S. PATENT DOCUMENTS

| | | | |
|---|---|---|---|
| 5,080,156 A | 1/1992 | Bartos | |
| 2004/0055291 A1* | 3/2004 | Meydieu | B60C 23/003 60/468 |
| 2005/0205182 A1* | 9/2005 | Maquaire | B60C 23/003 152/417 |
| 2008/0006357 A1 | 1/2008 | Wakabayashi et al. | |
| 2009/0084481 A1* | 4/2009 | Kalavitz | B60C 23/003 152/417 |
| 2009/0097792 A1* | 4/2009 | Kamikawa | F16C 33/768 384/448 |
| 2013/0047451 A1* | 2/2013 | Koumoto | G01B 21/042 33/501.7 |
| 2015/0007920 A1* | 1/2015 | Tanno | B60B 1/12 152/416 |
| 2015/0013866 A1* | 1/2015 | Tanno | B60B 1/12 152/417 |
| 2015/0352911 A1* | 12/2015 | Bittlingmaier | B60C 23/003 152/417 |

FOREIGN PATENT DOCUMENTS

| | | |
|---|---|---|
| DE | 3405111 A1 | 8/1985 |
| DE | 691 07 001 T2 | 8/1995 |
| DE | 692 04 527 T2 | 2/1996 |
| DE | 199 61 020 A1 | 6/2000 |
| DE | 103 60 764 B3 | 10/2005 |
| DE | 10 2008 062 073 A1 | 6/2010 |
| DE | 10 2009 051 930 A1 | 7/2010 |
| DE | 10 2009 048 750 A1 | 4/2011 |
| DE | 10 2011 006 123 A1 | 9/2012 |
| DE | 10 2013 207 855 A1 | 10/2014 |
| EP | 1 972 470 A1 | 9/2008 |
| EP | 2 045 100 A2 | 4/2009 |
| FR | 2 731 655 A1 | 9/1996 |
| FR | 2 872 087 A1 | 12/2005 |
| FR | 2 896 725 A1 | 8/2007 |
| GB | 1 496 932 A | 1/1978 |
| JP | 2006-248258 A | 9/2006 |
| JP | 2008-239025 A | 10/2008 |
| WO | WO 2012/071579 A1 | 5/2012 |

OTHER PUBLICATIONS

German-language Search Report issued in counterpart German Application No. 10 2014 219 981.6 dated Jul. 30, 2015 with partial English translation (10 pages).
German-language Search Report issued in counterpart German Application No. 10 2014 219 983.2 dated Aug. 14, 2015 with partial English translation (12 pages).
International Search Report (PCT/ISA/210) issued in PCT Application No. PCT/EP2015/069944 dated Nov. 3, 2015 with English translation (5 pages).
German-language Written Opinion (PCT/ISA/237) issued in PCT Application No. PCT/EP2015/069944 dated Nov. 3, 2015 (5 pages).
Chinese-language Office Action issued in counterpart Chinese Application No. 201580049318.1 dated Nov. 6, 2017 with English translation (15 pages).

* cited by examiner

ASSEMBLY AND METHOD FOR THE COMPRESSED AIR SUPPLY OF A WHEEL OF A VEHICLE

CROSS REFERENCE TO RELATED APPLICATIONS

This application is a continuation of PCT International Application No. PCT/EP2015/069944, filed Sep. 1, 2015, which claims priority under 35 U.S.C. § 119 from German Patent Application No. 10 2014 219 981.6, 10 2014 219 980.8, and 10 2014 219 983.2, filed Oct. 1, 2014, the entire disclosures of which are herein expressly incorporated by reference.

BACKGROUND AND SUMMARY OF THE INVENTION

The present invention relates to an assembly for the compressed air supply of a wheel of a vehicle, in particular of a motor vehicle. By means of the assembly, the tire pressure in the wheel of the vehicle can be varied while traveling.

The practice of varying the tire pressure in a vehicle can have a positive effect both on the traveling comfort and on the energy consumption. By way of example, an appropriately low tire pressure leads to a soft suspension in the tire and therefore to a more comfortable journey. An appropriately high tire pressure reduces the rolling resistance. This in turn reduces the energy consumption of the vehicle and thereby improves the $CO_2$ footprint. A constant problem with the construction of the compressed air supply is the guidance of compressed air from the compressed-air source in the vehicle to the rotating wheel. The document US2008/0006357A1 discloses an exemplary solution in this regard. In said document, the air is guided through appropriate bores and lines in the wheel suspension. However, bores of this nature should be dispensed with as far as possible, since each bore always has the disadvantage that it is complex to manufacture and weakens the corresponding component.

It is an object of the present invention to provide an assembly for the supply of compressed air to a wheel of a vehicle which allows for reliable and sustained operation both of the vehicle and also of the compressed air supply given inexpensive production and assembly. Furthermore, it is an object of the present invention to provide a corresponding method for tire inflation pressure regulation of the wheel.

This and other objects are achieved by an assembly and method according to embodiments of the invention.

According to the invention, an assembly is provided for the compressed air supply of a wheel of a vehicle. This assembly comprises a wheel with a tire and also an output (drive) shaft. The output shaft serves for transmitting torque to the wheel. Accordingly, the output shaft leads from the engine of the vehicle via any possible gear mechanisms to the wheel suspension.

The wheel is mounted on a wheel bearing of the assembly in a rotationally fixed manner. A toothing system is provided between the output shaft and the wheel bearing. The toothing system serves for transmitting torque from the output shaft to the wheel bearing. The wheel bearing is braced to the output shaft by means of a bolt. Said bolt extends coaxially to the output shaft in an inner hollow space of the wheel bearing. What is termed a wheel bearing annular space is defined in said hollow space radially outside the bolt. According to the invention, at least one compressed-air passage is provided from the wheel bearing annular space in the direction of the wheel. Furthermore, the assembly includes a compressed-air guide. This leads from a vehicle-side compressed-air source into the wheel bearing annular space and from the wheel bearing annular space through the at least one compressed-air passage to the wheel. In the wheel, the compressed air can be guided radially outward, for example through the spokes, to the rim and into the tire. According to the invention, provision is therefore made to utilize the wheel bearing annular space for guiding the compressed air. Accordingly, the at least one compressed-air passage is provided for conducting the compressed air introduced into the wheel bearing annular space further in the direction of the wheel.

In an advantageous embodiment, it is provided that a bolt head of the bolt bears against a contact surface on the wheel bearing. The at least one compressed-air passage is formed in the region of the contact surface, in the wheel bearing and/or in the bolt. In order to conduct the compressed air from the wheel bearing annular space further in the direction of the wheel, the compressed air has to be guided through the contact surface or close to the contact surface (i.e. in the wheel bearing) or through the bolt.

In the text which follows, different embodiments of the at least one compressed-air passage will be described. In this respect, it will always be appreciated that a plurality of the compressed-air passages can also be formed in the one assembly. In this context, it is also possible for the plurality of compressed-air passages to have different configurations. Thus, by way of example, one compressed-air passage may be present as a groove and another compressed-air passage may be present as a channel.

It is preferably provided that the compressed-air passage is formed by a groove in the wheel bearing on the contact surface and/or by a groove in the bolt head on the contact surface. A groove of this nature on the contact surface ensures that the bolt head does not completely seal off the wheel bearing annular space on the contact surface, but rather the compressed air can be guided through the groove further in the direction of the wheel.

Furthermore, it is preferably provided to form the compressed-air passage by a channel in the wheel bearing and/or by a channel in the bolt head. The channel in this respect is preferably formed as a bore. As an alternative thereto, it is also possible, for example during the casting of the wheel bearing, to insert a corresponding small tube and to encapsulate it by injection molding. The channels are formed so as to be as short as possible and are led merely around the contact surface, such that weakening of the corresponding components is avoided to the greatest possible extent. In this respect, it is possible to design a channel which passes merely through the bolt head. As an alternative or in addition thereto, a first channel can extend along the center axis of the bolt. A radially directed lateral channel encounters said first channel. The radially directed channel preferably extends through the entire bolt and as a result is easy to manufacture.

Furthermore, it is preferably provided to arrange a flat washer on the contact surface. At least one groove or a bore or a corresponding cutout is formed in said flat washer. The compressed air can thereby be conducted through the groove, bore or cutout in the flat washer from the wheel bearing annular space further in the direction of the wheel.

Instead of the flat washer, it is also possible for a spring ring to be arranged on the contact surface. The corresponding undulation of the spring ring in this respect allows for the formation of a compressed-air passage. It goes without saying here that the bolt is not tightened to such an extent that the spring ring bears fully over the entire surface thereof and forms a seal.

The flat washer or the spring ring can also be formed as a non-closed ring, e.g. in a C shape, in which case the open portion forms the cutout for the compressed air.

Furthermore, it is preferably provided to form the compressed-air passage by using an air-permeable, for example porous, material. This air-permeable material is used as part of the wheel bearing and/or as at least part of the bolt or as at least part of the flat washer. Sintered metal, metal foam or porous PTFE foam (polytetrafluoroethylene) is used with preference for the air-permeable material. It is also possible for the material known by the trade name Metapor to be used here as the air-permeable material.

As has already been described in the introduction, the output shaft is connected to the wheel bearing by way of a toothing system. It has been acknowledged that the compressed air can be guided into the wheel bearing annular space through this toothing system, even if the toothing system is embodied as a splined shaft connection. Such a toothing system, even in a design without play, always has clearances. Here, the splined shaft connection is also regarded in general terms as a toothing system, since the splined shaft connection likewise has clearances at the splines (=teeth).

The clearances are located between the heads of the teeth and the opposing valleys between the teeth. Furthermore, even in the case of the design without play, the involute form of the teeth means that there are clearances between the flanks bearing against one another. Therefore, the compressed-air guide described advantageously leads from the vehicle-side compressed-air source through the toothing system into the wheel bearing annular space. Without modifying existing components, the guidance of the compressed air can therefore be routed from the non-rotating portions of the vehicle into the rotating portions. The wheel bearing annular space adjoins the toothing system on the wheel side. Therefore, the described embodiment of the compressed-air passage from the wheel bearing annular space in the direction of the wheel can advantageously be employed particularly when the compressed air is conducted through the toothing system.

Therefore, the compressed-air guide preferably leads from the vehicle-side compressed-air source to a first annular space. The first annular space directly adjoins the toothing system, and therefore the compressed air can be conducted via the first annular space through the clearances between the teeth of the toothing system. The wheel bearing annular space (also: second annular space) is located on the other side of the toothing system. The compressed air is guided from the wheel bearing annular space to the wheel and via the wheel into the tire. The two annular spaces, upstream and downstream of the toothing system in the direction of flow, ensure that the compressed air is conducted via all of the clearances of the toothing system. The sum total of all clearances of the toothing system forms a sufficiently large cross section for the compressed-air guide.

Furthermore, provision is preferably made of a wheel carrier which can be fastened on the vehicle, in particular by way of chassis links. By way of example, the wheel carrier can be in the form of a pivot bearing. The wheel bearing is mounted rotatably with respect to the wheel carrier. By way of example, a rolling bearing is located between the wheel bearing and the wheel carrier.

A compressed-air line is advantageously provided in or on the wheel carrier. The compressed-air line leads to the first annular space. The compressed-air line can be formed here at least in certain places in the interior of the wheel carrier. The compressed-air line is supplied by the compressed-air source in the vehicle. It is also provided in particular here that a compressed-air source is utilized for a plurality of wheels of the vehicle.

The first annular space is advantageously formed by at least one non-rotating portion of the assembly and at least one rotating portion of the assembly. The non-rotating portion of the assembly is advantageously the wheel carrier. The rotating portion of the assembly is formed in this region in particular by the output shaft and/or the wheel bearing. Furthermore, the inner ring of the rolling bearing, which is fixedly connected to the wheel bearing, can likewise delimit the first annular space. The first annular space advantageously directly adjoins the described toothing system, such that the compressed air is distributed via the first annular space directly over all of the clearances of the toothing system. A sealing assembly is preferably located between the non-rotating portion and the rotating portion. The sealing assembly seals off the first annular space with respect to the surroundings.

The sealing assembly advantageously includes at least one sealing lip. The sealing lip is designed in such a manner that it does not seal off the first annular space in the case of a correspondingly low pressure in the first annular space. Since it does not provide a seal in this state, the sealing lip also does not abrade and therefore is not subjected to wear. The sealing lip is moved by the pressure and provides a seal in the process only in the case of a correspondingly high pressure in the first annular space.

Furthermore, provision is preferably made of a control valve, which is arranged downstream of the compressed-air passage, preferably in the hub region of the wheel or in the wheel bearing. After the compressed-air passage, the compressed air therefore flows advantageously into the control valve. After the control valve, the compressed air is guided through the spokes and the rim into the tire. The control valve is advantageously in the form of a pneumatic control valve, with the compressed air being used not only for inflating the tire but also for actuating the control valve.

The invention furthermore encompasses a method for tire inflation pressure regulation of the vehicle, in particular a motor vehicle, comprising the following steps: (i) providing a compressed-air guide from the vehicle into the tire, wherein the tire can be inflated with air pressure from the compressed-air guide. The compressed-air guide can be formed by separate channels and lines. Furthermore, it is also possible to utilize already existing hollow spaces for the compressed-air guide. It is decisive that the compressed-air guide leads from the vehicle-side compressed-air source into the tire. The text which follows refers to "non-rotating portions" of the vehicle and to "rotating portions" of the vehicle. The rotating portions of the vehicle are in particular the wheel bearing, the wheel mounted on the wheel bearing and the tire mounted on the wheel. The wheel in turn usually has a hub region, a plurality of spokes and the rim.

The method furthermore comprises (ii) measuring an actual pressure in the tire using a sensor. The sensor is located in this respect in the rotating portion of the vehicle, i.e. in particular in the wheel bearing, in the wheel or in the tire. (iii) The measured actual pressure is transmitted wirelessly to a control unit. The control unit is located in the non-rotating portion of the vehicle, for example within the vehicle body. A control valve is located in the compressed-air guide, between the compressed-air source and the tire. (iv) The control valve is actuated depending on the transmitted actual pressure. In this case, the control valve can be actuated into at least two switch positions. A first switch position serves for inflating the tire with compressed air from the compressed-air guide. The second switch position serves for letting the compressed air out of the tire into the surroundings.

According to the invention, the wireless transmission of the measured actual pressure means that there is no need for a tethered connection between the rotating portions and the non-rotating portions of the vehicle. Furthermore, the control unit can independently adapt the actual pressure in the tire to a desired target pressure. This is effected by appropriately actuating the control valve depending on the actual pressure. The target pressure can be determined on the one hand by driver stipulation, and on the other hand can be calculated on the basis of vehicle data. Thus, it may be concluded, for example, that an energy-saving mode of driving is appropriate. The target pressure is accordingly increased. If a more comfortable journey is required, the target pressure can be lowered in order to thereby lower the tire rigidity.

It is advantageously provided that the control valve can be actuated pneumatically. In this respect, the control unit varies the pressure in the compressed-air guide depending on the transmitted actual pressure. A first pressure in the compressed-air guide in this respect brings about the first switch position. A second pressure brings about the second switch position. At least two switch positions are therefore provided.

Furthermore, it is advantageously provided that the control valve is located in the rotating portion of the vehicle. In particular, the control valve is arranged, preferably centrically, in the hub region of the wheel or in the wheel bearing. Particularly when the control valve is arranged in the rotating portion of the vehicle, it is advantageous to pneumatically actuate the control valve. As a consequence, there is no need for data-carrying or power-carrying lines, for instance for a solenoid valve, in the rotating portion. The compressed-air guide which is present in any case can also be utilized for signal transmission and for actuating the control valve.

In particular, it is provided that the second pressure for switching into the second switch position is higher than the first pressure for switching into the first switch position. The second switch position is used for letting the air pressure out of the tire. This embodiment ensures that the air pressure is let out of the tire only when there are sufficiently high energy reserves in the vehicle. As a result, it is relatively highly likely that sufficient energy or power for re-inflating the tire is also available after the air pressure has been let out.

Furthermore, it is preferably provided that not only the actual pressure but also a temperature is measured in or on the tire. This temperature, too, is advantageously transmitted wirelessly to the control unit. When actuating the control valve, the control unit can thereby take into account not only the actual pressure but also the temperature.

The invention furthermore encompasses an assembly for tire inflation pressure regulation of a vehicle. The assembly includes a compressed-air source arranged in the non-rotating portion of the vehicle, and also a compressed-air guide from the compressed-air source to the tire of the vehicle. A control valve is arranged in the compressed-air guide. Furthermore, the assembly includes a control unit in the non-rotating portion of the vehicle for actuating the control valve. A sensor is located in the rotating portion of the vehicle, in particular in the wheel bearing, wheel or tire. The sensor serves for determining the actual pressure in the tire. An apparatus for wireless signal transmission is used to transmit the actual pressure to the control unit. The control unit is designed to actuate the control valve, depending on the wirelessly transmitted actual pressure, into a first switch position for inflating the tire and into a second switch position for letting the compressed air out of the tire.

The advantageous embodiments described in the context of the method according to the invention for tire inflation pressure regulation of the vehicle are correspondingly advantageously applicable to the assembly according to the invention for tire inflation pressure regulation of a vehicle.

In particular, it is also provided in the case of the assembly that the control valve can be actuated pneumatically. Accordingly, the control unit is designed to vary the pressure in the compressed-air guide depending on the wirelessly transmitted actual pressure.

The control valve is advantageously located in the rotating portion of the vehicle. The pneumatic actuation of the control valve is suitable particularly in the case of this assembly.

The air pressure in the compressed-air guide is advantageously utilized simultaneously for actuating the control valve and for inflating the tire. There is therefore only one compressed-air guide from the non-rotating portion to the rotating portion and therefore into the tire.

The method according to the invention for tire inflation pressure regulation of the vehicle and the advantageous embodiments described in this respect are correspondingly advantageously applicable to the assembly according to the invention for the compressed air supply of a wheel of a vehicle.

The assembly according to the invention for the compressed air supply of a wheel of a vehicle and the advantageous embodiments described in this respect are correspondingly advantageously applicable to the method according to the invention for tire inflation pressure regulation of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

An assembly 1 for the supply of compressed air to a wheel 7 will be described in detail hereinbelow with reference to FIGS. 1 to 12.

Figure 1:
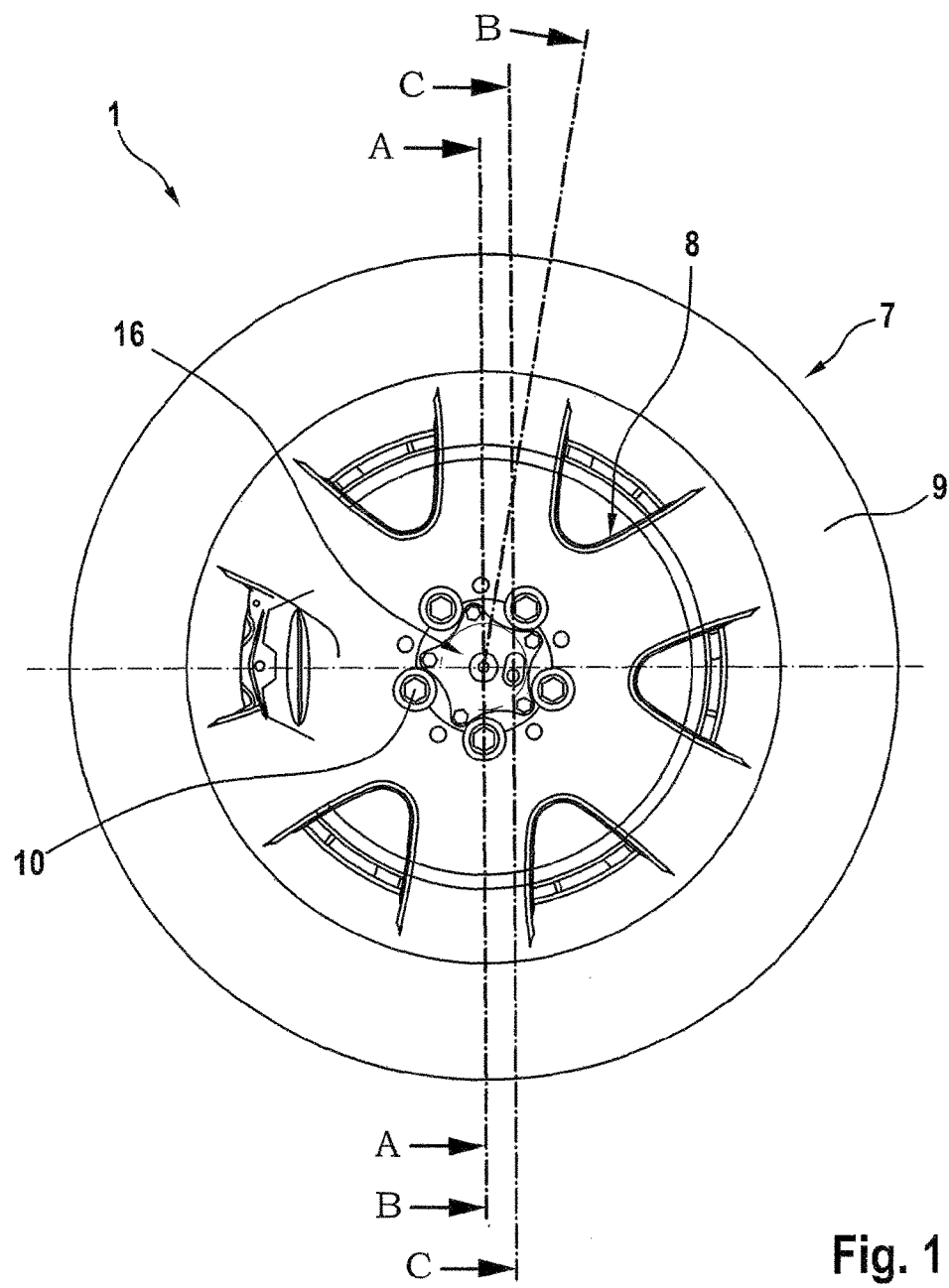
FIG. 1 is an assembly according to the invention for compressed air supply according to one exemplary embodiment.

FIG. 1 shows the wheel 7 of the assembly 1. The assembly 1 is a component part of a motor vehicle. The wheel 7 is located in particular on a driven axle of the motor vehicle with a single-wheel suspension, a twist beam axle or a rigid axle.

The wheel 7 has a rim with a plurality of spokes 8 and a hub region. A tire 9 is mounted on the rim. The wheel 7 is fastened by way of wheel bolts 10.

Figure 2:
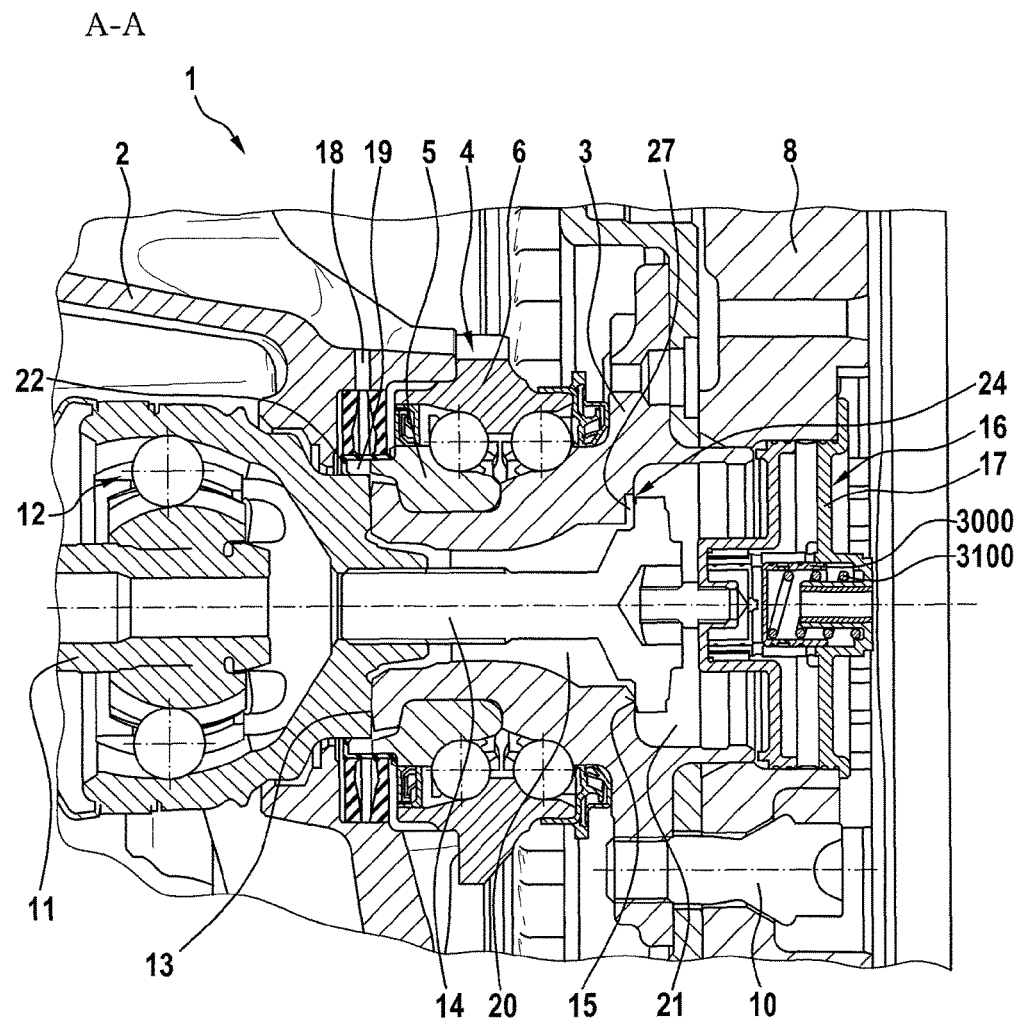
FIG. 2 is the section A-A indicated in FIG. 1.

FIG. 1 shows three sectional planes A-A, B-B and C-C. The sectional view A-A is shown in FIG. 2. FIGS. 3 to 9 each show details, likewise in the sectional plane A-A.

FIG. 2 shows a section of a wheel carrier 2. At its end which is not shown, the wheel carrier 2 is connected, preferably via chassis links, to the vehicle body or an axle carrier of the vehicle. Furthermore, FIG. 2 shows a wheel bearing 3. A rolling bearing 4 is arranged between the wheel bearing 3 and the wheel carrier 2. An inner ring 5 of the rolling bearing 4 is connected fixedly to the wheel bearing 3. An outer ring 6 of the rolling bearing 4 is connected fixedly to the wheel carrier 2.

Figure 11:
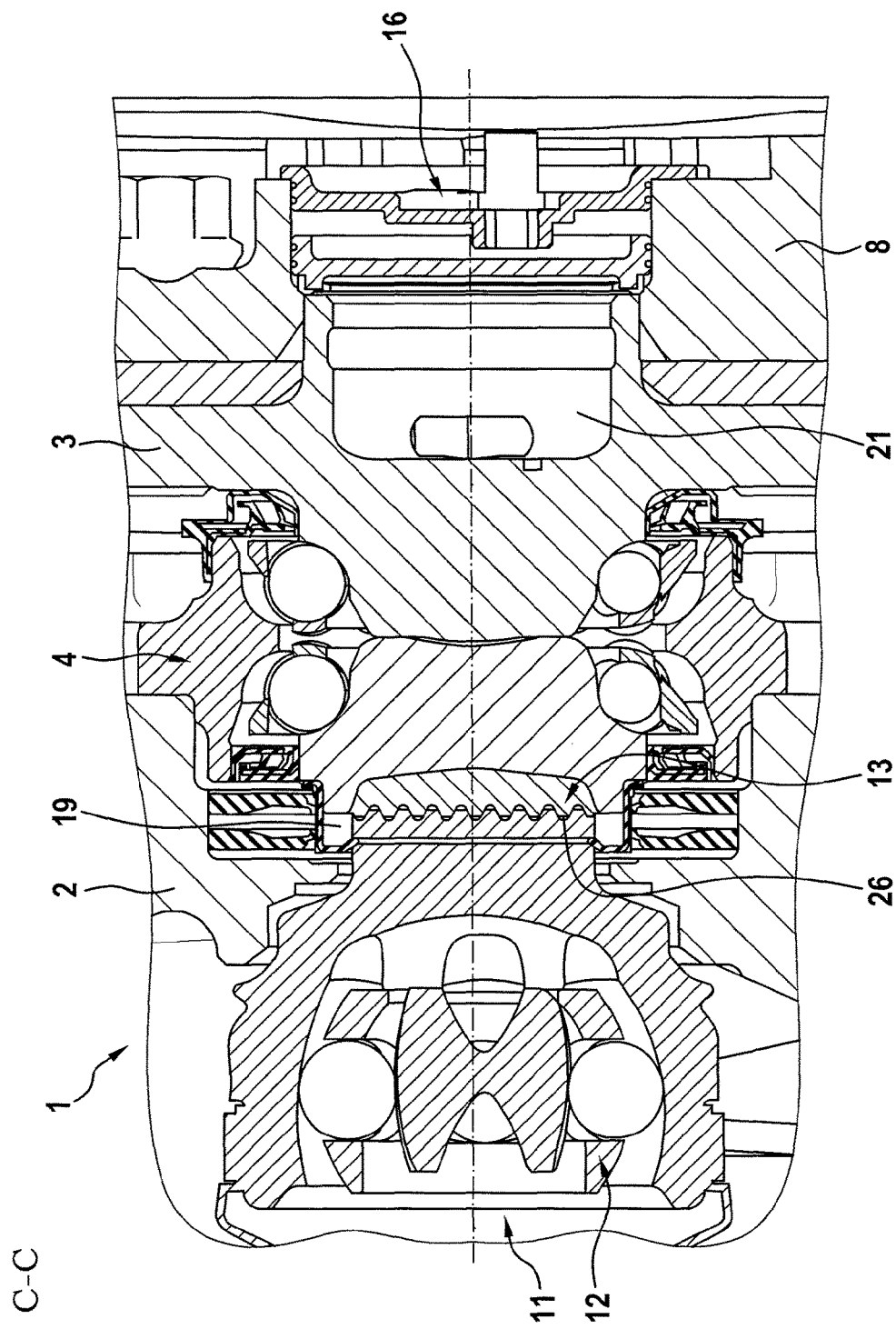
FIG. 11 is the section C-C indicated in FIG. 1.

An output shaft 11 leads from the drive (not shown) of the vehicle in the direction of the wheel suspension. The output shaft 11 has the articulation bell 12 which is shown. A toothing system 13 is provided for transmitting torque from the output shaft 11 to the wheel bearing 3. The toothing system 13 can be readily seen in particular in the section C-C as shown in FIG. 11. In the exemplary embodiment shown, this is a spur gear toothing system, in particular a Hirth toothing system. Alternatively, by way of example, a radial toothing system or a splined shaft connection could also be used here.

The wheel bearing 3 is braced or tensioned to the output shaft 11 by way of a bolt 14. The bolt 14 extends coaxially with the output shaft 11. The head of the bolt 14 bears against the wheel bearing 3 at a contact surface 15.

Furthermore, FIG. 2 shows a valve assembly 16 in the hub region of the wheel 7. The valve assembly 16 includes a control valve 17.

The text which follows describes the compressed air supply of the wheel 7. A compressed-air line 18 is provided in or on the wheel carrier 2. The compressed-air line 18 guides the compressed air from a vehicle-side compressed-air source to a first annular space 19. The first annular space 19 is delimited at least by the wheel carrier 2, the inner ring 5 and the output shaft 11. The first annular space 19 directly adjoins the radial outer side of the toothing system 13. A sealing assembly 22 is provided in the first annular space 19. The sealing assembly will be explained in detail with reference to FIG. 12.

The compressed air is guided from the first annular space 19 into a wheel bearing annular space 20 (also: second annular space) through the clearances 26 (see FIG. 11) between the teeth of the toothing system 13. The wheel bearing annular space 20 is formed by the internally hollow wheel bearing 3 and is delimited radially on the inside by the bolt 14.

Figure 12:
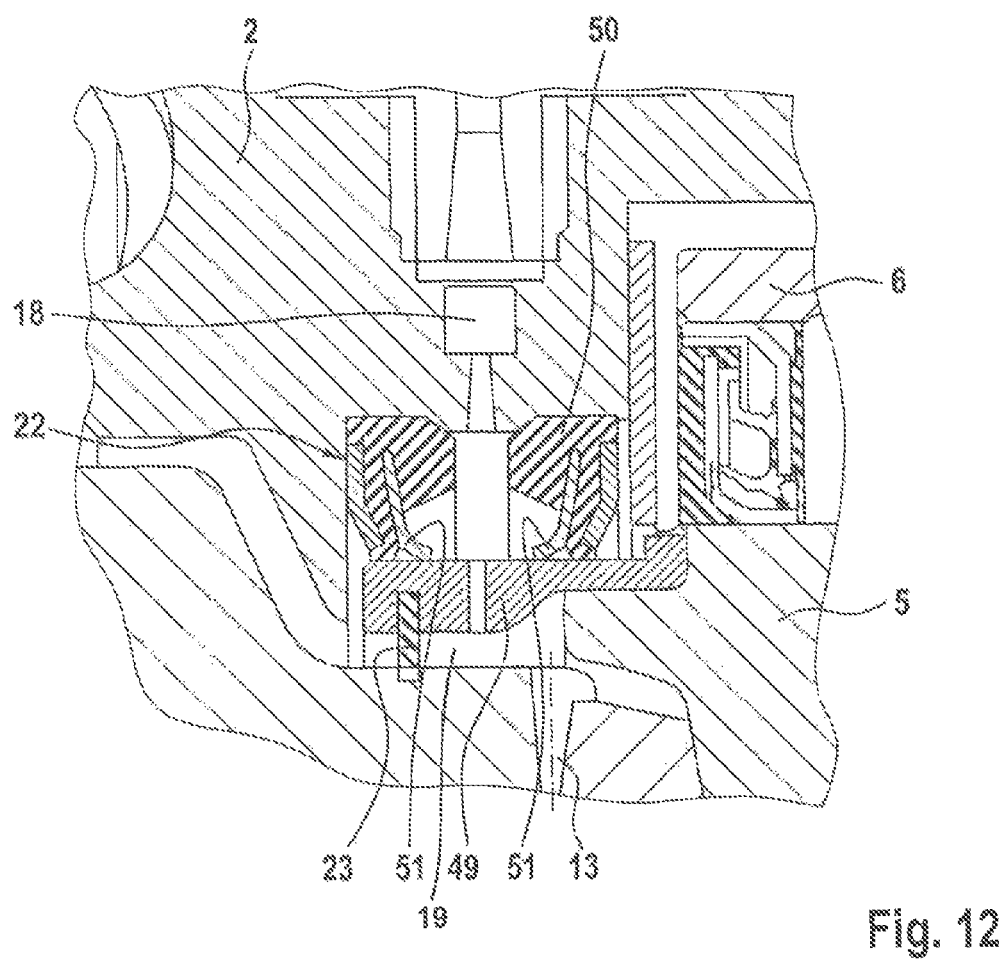
FIG. 12 is a sealing assembly of the assembly according to the invention according to the exemplary embodiment.

FIG. 12 shows in detail the sealing assembly 22 in the first annular space 19. The sealing assembly 22 serves for sealing off the first annular space 19 with respect to the surroundings. An annular component 49 is arranged in the first annular space 19. The annular component 49 is fixedly connected to the rotating portion, preferably to the inner ring 5. A plurality of cutouts, preferably bores, are provided in the annular component 49 in order to allow the compressed air to pass through inwardly in the radial direction.

Radially outside the annular component 49, the sealing assembly 22 includes an elastomer block 50. Two sealing lips 51 are fastened in the elastomer block 50. The elastomer block 50 acts as a spring on the two sealing lips 51 and subjects the sealing lips 51 to loading, such that they do not bear against the annular component 49 in the case of a correspondingly low pressure. Since they do not bear against the component in this state, the sealing lips 51 also do not abrade and therefore are not subjected to wear. The sealing lips 51 are moved by the pressure and provide a seal in the process only in the case of a correspondingly high pressure.

That region of the first annular space 19 which is situated radially within the annular component 49 is sealed off by a static sealing lip 23.

The compressed-air guide from the wheel bearing annular space 20 in the direction of the wheel 7 allows for at least one compressed-air passage 24 in the region of the contact surface 15 of the bolt head. In the illustration shown in FIG. 2, the compressed-air passage 24 is formed by a groove 27 in the wheel bearing 3. Since here the groove 27 is formed in certain places on the contact surface 15, the bolt head does not provide a complete seal, and therefore the compressed air can be conducted from the wheel bearing annular space 20 further in the direction of a third annular space 21.

Figure 10:
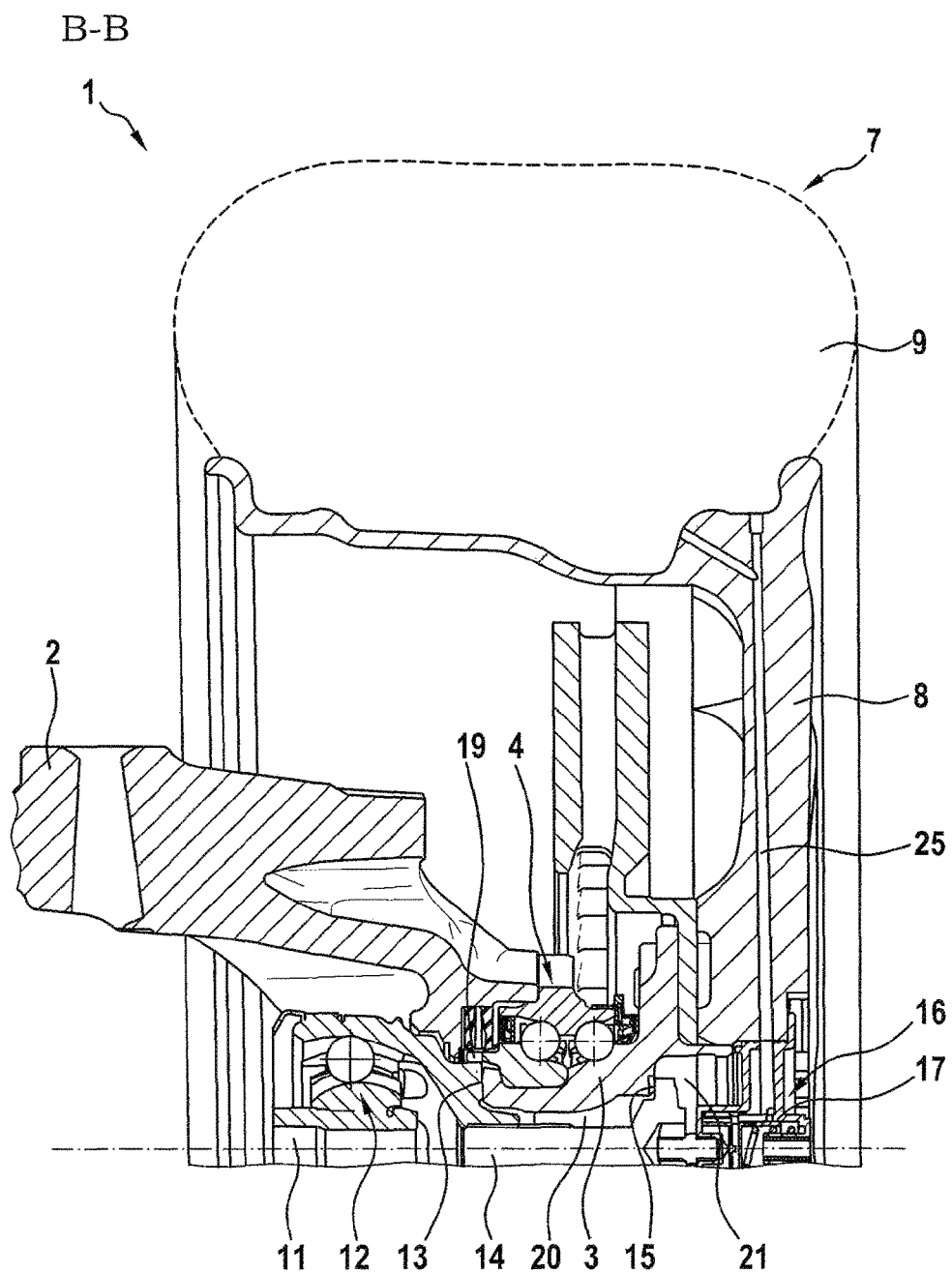
FIG. 10 is the section B-B indicated in FIG. 1.

The third annular space 21 is located axially outside the bolt head of the bolt 14 and in the interior of the wheel bearing 3 and/or in the hub region of the wheel 7. The third annular space 21 is closed to the outside, with respect to the surroundings, by the valve assembly 16. The control valve 17 is provided in the valve assembly 16. The compressed-air guide leads from the third annular space 21 into the control valve 17. The control valve 17 guides the compressed air radially outward into the spokes 8. In particular, the section B-B in FIG. 10 shows the compressed-air guide from the control valve 17 into the tire 9. To this end, at least one rim line 25 is provided in at least one spoke 8. The rim line leads from the hub region to the rim and therefore into the tire 9.

The control valve 17 includes a spring-loaded piston. In the case of a first pressure over the described compressed-air guide, the piston moves and allows for the tire 9 to be inflated. In the case of a second pressure, which is higher than the first pressure, the piston moves further counter to the spring force and in the process allows for the pressure to be let out of the tire 9 into the surroundings. The control valve 17 is therefore pneumatically controllable. There is no need for power-supplying lines from the vehicle to the control valve 17.

FIGS. 3 to 9 each show a section from FIG. 2, each with a different embodiment of the compressed-air passage 24. These different embodiments of the compressed-air passage 24 can all be combined with one another. It is therefore possible for different compressed-air passages 24 to be formed in the region of a contact surface 15.

Figure 3:
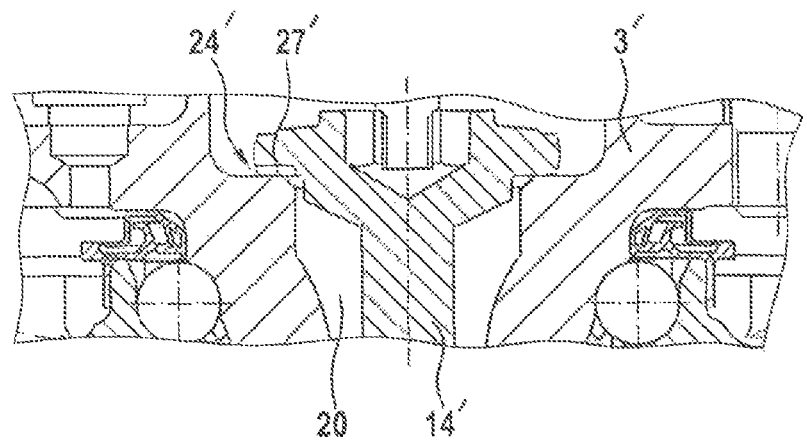
FIG. 3 shows an exemplary embodiment of a compressed-air passage of the assembly according to the invention.

As shown in FIG. 3, a groove 27', which forms the compressed-air passage 24', is located in that side of the bolt head which faces toward the contact surface.

Figure 4:
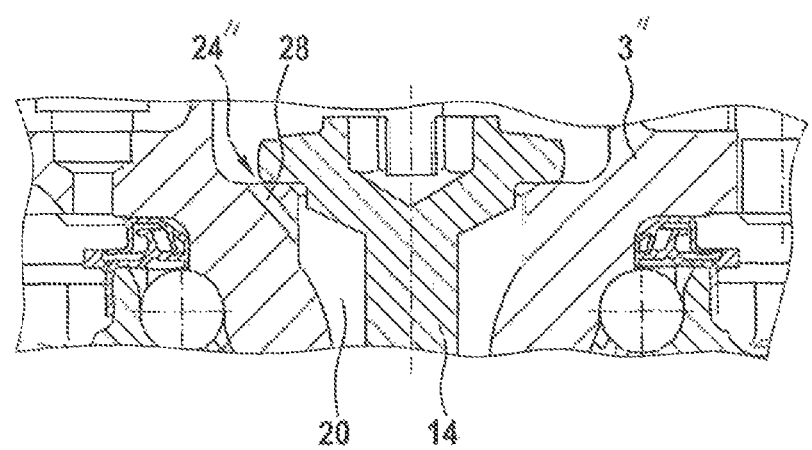
FIG. 4 shows another embodiment of a compressed-air passage of the assembly according to the invention.

As shown in FIG. 4, a short channel 28 is provided in the wheel bearing 3". The channel 28' leads from the wheel bearing annular space 20 into the third annular space 21, bypassing the contact surface 15.

Figure 5:
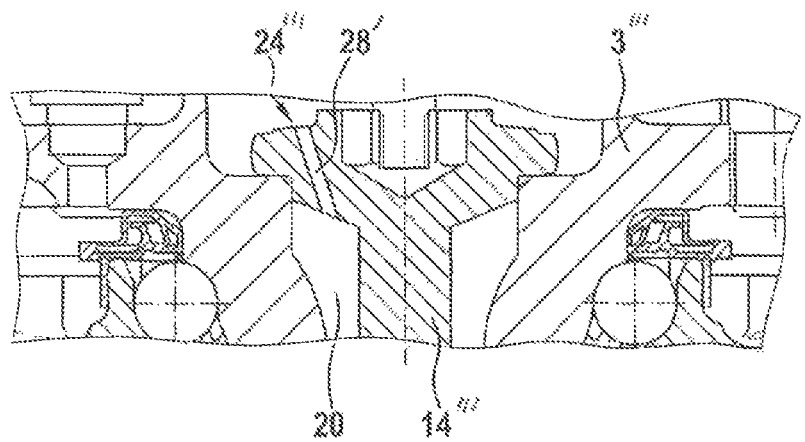
FIG. 5 shows another embodiment of a compressed-air passage of the assembly according to the invention.

As shown in FIG. 5, a short channel 28' leads in a straight design through the bolt head.

Figure 6:
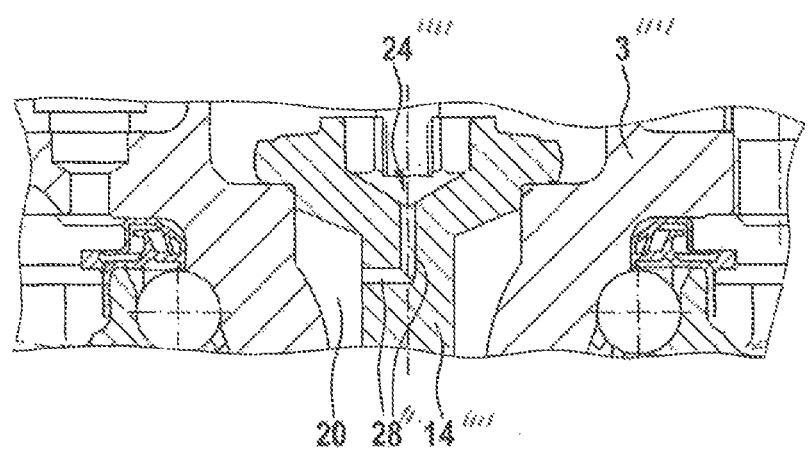
FIG. 6 shows another embodiment of a compressed-air passage of the assembly according to the invention.

FIG. 6 shows a further design of the channel 28" in the bolt 14"". Here, a first radially directed channel 28" leads from the wheel bearing annular space 20 to the longitudinal axis of the bolt 14"". At the longitudinal axis of the bolt, a second channel 28" leads to the center of the bolt head and therefore into the third annular space 21. By way of example, the bolt head has a hexagon socket. The channel 28" in FIG. 6 opens out in the hexagon socket.

The channels which are shown in FIGS. 4, 5 and 6 are designed so as to be as short as possible and bypass merely the contact surface 15. In this respect, the channels can be embodied in the simplest form as bores. Alternatively, corresponding small tubes can also be inserted in the case of cast parts.

Figure 7:
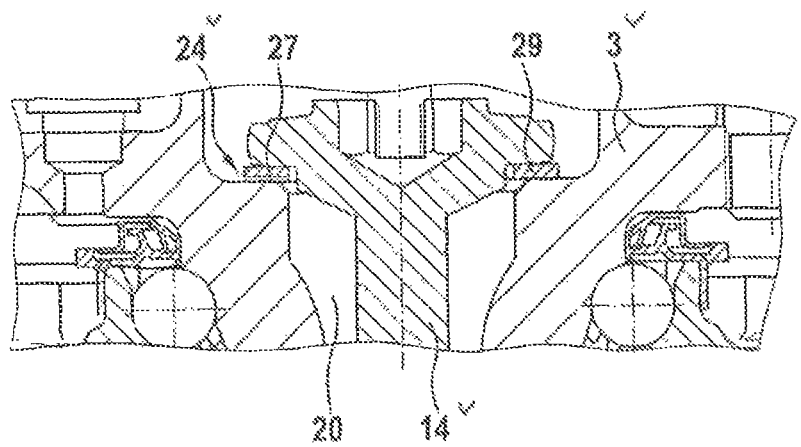
FIG. 7 shows another embodiment of a compressed-air passage of the assembly according to the invention.

As shown in FIG. 7, a flat washer 29 is used at the contact surface 15. A groove 27 is provided in turn in said flat washer 29 and forms the compressed-air passage $24^v$.

Figure 8:
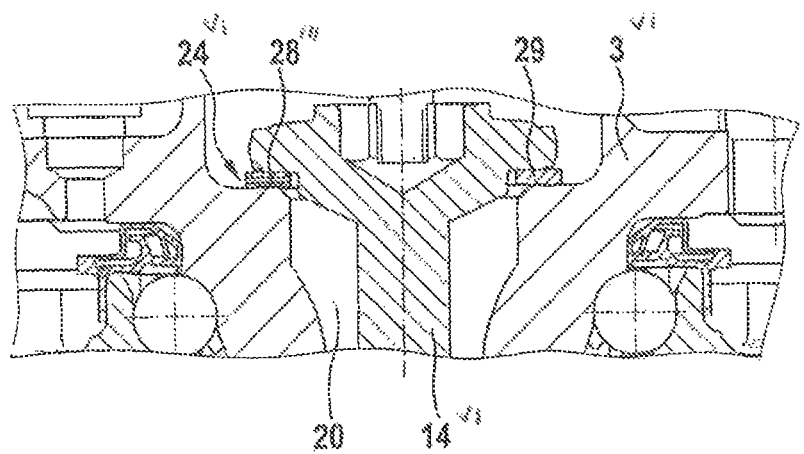
FIG. 8 shows another embodiment of a compressed-air passage of the assembly according to the invention.

As shown in FIG. 8, a channel 28''' can also be formed in the flat washer 29 as the compressed-air passage $24^{vi}$.

Figure 9:
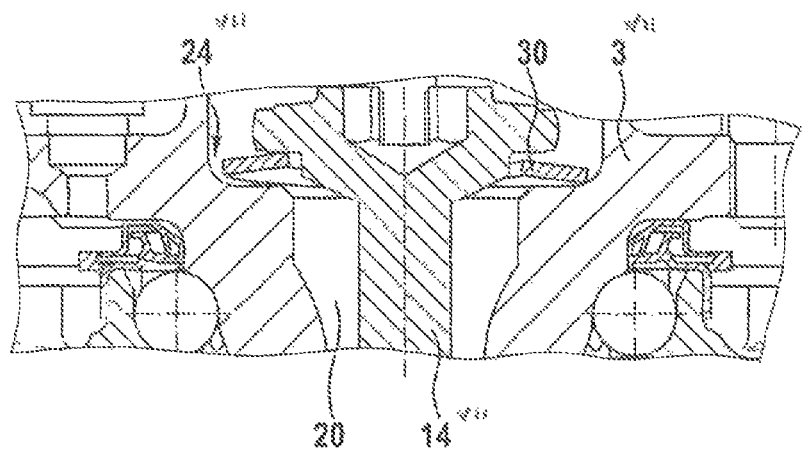
FIG. 9 shows another embodiment of a compressed-air passage of the assembly according to the invention.

FIG. 9 shows the use of a spring ring 30 at the contact surface 15. The corresponding undulation of the spring ring 30 affords an adequate clearance which can be utilized as the compressed-air passage $24^{vii}$.

In addition or as an alternative to designing the compressed-air passage 24 in the form of grooves 27 or channels 28, it is also provided to use an air-permeable material in the corresponding region of the wheel bearing 3, the bolt 14, the flat washer 29 or the spring ring 30. The air-permeable material is in particular porous material, for example sintered metal, metal foam or porous PTFE foam.

The invention furthermore encompasses the following assembly, in which the clearances 26 between the teeth can also be utilized independently of the compressed-air passage 24 on the bolt 14.

Point 1. Assembly (1) for the compressed air supply of a wheel (7) of a vehicle, comprising: a wheel (7) with a tire (9), an output shaft (11) for transmitting torque to the wheel (7), a wheel carrier (2) which can be fastened on the vehicle, a wheel bearing (3), on which the wheel (7) is mounted in a rotationally fixed manner, wherein the wheel bearing (3) is mounted rotatably on the wheel carrier (2), a toothing system (13) between the output shaft (11) and the wheel bearing (3), and a compressed-air guide, which leads from a vehicle-side compressed-air source through clearances (26) between teeth of the toothing system (13), from the toothing system (13) to the wheel (7), and from the wheel (7) into the tire (9).

Point 2. Assembly according to point 1, wherein the compressed-air guide leads from the vehicle-side compressed-air source to a first annular space (19), from the first annular space (19) through the clearances (26) between the teeth of the toothing system (13), from the toothing system (13) into a second annular space (20), from the second annular space (20) to the wheel (7).

Point 3. Assembly according to point 2, comprising a compressed-air line (18) in and/or on the wheel carrier (2), which leads from the compressed-air source to the first annular space (19).

Point 4. Assembly according to either of points 2 and 3, wherein the first annular space (19) is formed by at least one non-rotating portion of the assembly (1), in particular the wheel carrier (2), and at least one rotating portion of the assembly (1), in particular the output shaft (11) and/or the wheel bearing (3), wherein the first annular space (19) is sealed off with respect to the surroundings by way of a sealing assembly (22).

Point 5. Assembly according to point 4, wherein the sealing assembly (22) includes at least one sealing lip (51), wherein the sealing lip (51) does not provide a seal and does not abrade in the case of a correspondingly low pressure in the first annular space (19), and wherein the sealing lip (51) is movable and thus provides a seal by virtue of a correspondingly high pressure.

Point 6. Assembly according to one of points 2 to 5, wherein the wheel bearing (3) is braced to the output shaft (11) by use of a bolt (14), wherein the bolt (14) is arranged coaxially to the output shaft (11), and wherein the second annular space (20) is defined in the interior of the wheel bearing (3) and radially outside the bolt (14).

Point 7. Assembly according to point 6, including a contact surface (15) on the wheel bearing (3), against which the bolt (14) bears, and at least one compressed-air passage (24) in the region of the contact surface (15), wherein the compressed-air passage (24) leads from the second annular space (20) into a third annular space (21).

Point 8. Assembly according to one of the preceding points, including a control valve (17) in the compressed-air guide between the pressure source and the tire (9).

Point 9. Assembly according to point 8, wherein the control valve (17) is arranged between the third annular space (21) and the tire (9), preferably in the hub region of the wheel (7) or in the wheel bearing (3).

Point 10. Method for the compressed air supply of a wheel (7) of a vehicle, wherein the compressed air is guided from a vehicle-side pressure source through clearances (26) between teeth of a toothing system (13) to the wheel (7), wherein the toothing system (13) is used for transmitting torque from the drive of the vehicle to the wheel (7).

Figure 13:
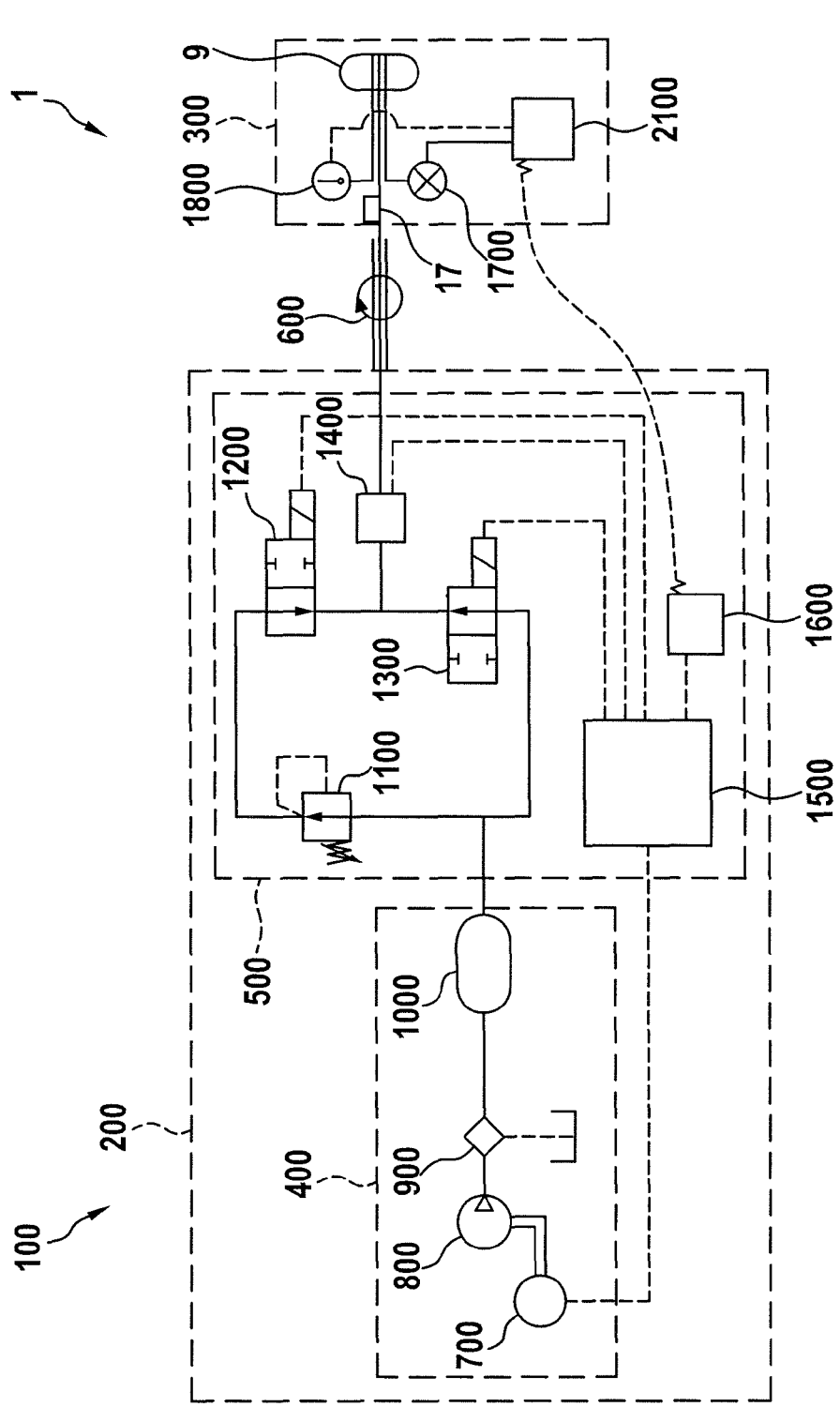
FIG. 13 is a schematic view of an assembly according to the invention for tire inflation pressure regulation of a vehicle according to a further exemplary embodiment.

FIG. 13 shows a schematic view of an assembly 100 for tire inflation pressure regulation of a vehicle. The assembly 100 is used for carrying out the method for tire inflation pressure regulation of the vehicle. The structural embodiment of the assembly 100 corresponds to the illustrations in FIGS. 1 to 12.

FIG. 13 shows the assembly 100, which is fundamentally divided into a non-rotating portion 200 and a rotating portion 300. The non-rotating portion 200 is arranged in the vehicle, for example within the vehicle body. Of the rotating portion 300, the tire 9 is shown in detail. Furthermore, the rotating portion 300 includes the wheel 7 on which the tire 9 is mounted, and also the wheel bearing 3 on which the wheel 7 is mounted.

A compressed-air source 400 and a control unit 500 are located in the non-rotating portion 200. Via a rotary leadthrough 600, the compressed-air guide leads from the non-rotating portion 200 into the rotating portion 300, in particular into the tire 9. The rotary leadthrough 600 has been described previously by way of example by the toothing system 13.

The compressed-air source 400 includes a motor 700. This may be a separate electric motor. Alternatively, the drive assembly of the vehicle can also be used here. A compressor 800 is driven by way of the motor 700. The compressor 800 compresses air and conducts the air into a pressure accumulator 1000. An air treatment unit 900 for drying air is located between the compressor 800 and the pressure accumulator 1000.

The control unit 500 includes two solenoid valves 1200, 1300 connected in parallel. A pressure reducer 1100 is connected upstream of the first solenoid valve 1200. The solenoid valves 1200, 1300 are designed here as stop valves, which can either be open or closed. On account of the pressure reducer 1100, the first solenoid valve 1200 can release a first, lower pressure. A second, higher pressure is present at the second solenoid valve 1300. After the solenoid valves 1200, 1300, the compressed-air guide leads to a distributor block 1400. The compressed-air guide leads via the distributor block 1400 to the individual tires 9 of the vehicle. For the sake of simplicity, only one tire 9 is shown here.

The control unit 500 has a signal processing unit 1500 and a radio receiver 1600. The signal processing unit 1500 actuates the two solenoid valves 1200, 1300. It is preferable that the signal processing unit 1500 also actuates the distributor block 1400 and also the motor 700. It is decisive that, by the actuation of the two solenoid valves 1200, 1300, the signal processing unit 1500 can conduct at least two different pressures via the compressed-air guide further into the rotating portion 300.

The control valve 17 is located in the rotating portion 300 in the compressed-air guide. The control valve 17 allows for at least two switch positions. In the first switch position, the tire 9 can be inflated. In the second switch position, compressed air can be let out of the tire 9.

Furthermore, a pressure sensor 1700 and a temperature sensor 1800 are provided in the rotating portion. The pressure sensor 1700 measures the actual pressure in the tire 9. The temperature sensor 1800 measures the temperature in or on the tire 9.

A radio transmitter 2100 of the rotating portion 300 wirelessly transmits the actual pressure and the measured temperatures to the radio receiver 1600 of the control unit 500. The wireless transmission is effected by way of electromagnetic waves, light or sound.

As shown in FIG. 2, the control valve 17 includes a linearly movable valve body 3000, preferably in the form of a piston. The valve body 3000 is loaded by a spring 3100. By linearly displacing the valve body 3000, it is possible to achieve the two switch positions for inflating the tire 9 and for letting the compressed air out. The valve body 3000 is in this respect movable counter to the spring force by the pressure in the compressed-air guide.

FIG. 10 shows in detail, on the basis of the section B-B, a rim line 25, which leads within the wheel 7 from the hub region through the spoke into the rim and therefore into the tire 9. Via the rim line 25, compressed air can be introduced into the tire 9 and let out of the tire 9.

FIG. 13 shows the possibility to actuate the control valve 17 merely by way of the pneumatic pressure. There is therefore no need for any additional lines from the non-rotating portion 200 into the rotating portion 300. In order to adapt the actual pressure in the tire 9 to the desired target pressure, what is needed is the pressure sensor 1700 and a corresponding feedback of the measured data. The wireless data transmission is utilized for this purpose. For this transmission, too, there is thereby no need for any additional cable between the rotating portion 300 and the non-rotating portion 200. With the pressure sensor 1700 and the temperature sensor 1800 in the rotating portion, it is possible to measure the corresponding values very close to the tire 9 or in the tire 9.

LIST OF REFERENCE SIGNS

1 Assembly
2 Wheel carrier (pivot bearing)
3 Wheel bearing
4 Rolling bearing
5 Inner ring
6 Outer ring
7 Wheel
8 Spokes
9 Tire
10 Wheel bolt
11 Output shaft
12 Articulation bell
13 Toothing system
14 Bolt
15 Contact surface
16 Valve assembly
17 Control valve
18 Compressed-air line
19 First annular space
20 Wheel bearing annular space (second annular space)
21 Third annular space
22 Seal
24 Compressed-air passage
25 Rim line
26 Clearances
27 Groove
28 Channel/bore
29 Flat washer
30 Spring ring
49 Annular component
50 Elastomer block
51 Sealing lips
100 Assembly
200 Non-rotating portion
300 Rotating portion
400 Compressed-air source
500 Control unit
600 Rotary leadthrough
700 Motor
800 Compressor
900 Air treatment unit
1000 Pressure accumulator
1100 Pressure reducer
1200 First solenoid valve
1300 Second solenoid valve
1400 Distributor block
1500 Signal processing unit
1600 Radio receiver
1700 Pressure sensor
1800 Temperature sensor
2100 Radio transmitter
3000 Valve body
3100 Spring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. An assembly for compressed air supply in a vehicle, comprising:
a wheel with a tire;
an output shaft for transmitting torque to the wheel;
a wheel bearing, on which the wheel is mounted in a rotationally fixed manner;
a toothing system between the output shaft and the wheel bearing;

a bolt by which the wheel bearing is braced to the output shaft, wherein the bolt is arranged coaxially with the output shaft, and wherein a wheel bearing annular space is defined in an interior of the wheel bearing and radially outside the bolt;

at least one compressed-air passage from the wheel bearing annular space in the direction of the wheel; and a compressed-air guide, which leads from a vehicle-side compressed-air source into the wheel bearing annular space, from the wheel bearing annular space through the at least one compressed-air passage to the wheel, and from the wheel into the tire.

2. The assembly as claimed in claim 1, wherein a bolt head of the bolt bears against a contact surface on the wheel bearing, and the at least one compressed-air passage is formed in the region of the contact surface, in the wheel bearing and/or in the bolt.

3. The assembly as claimed in claim 2, wherein the compressed-air passage is formed by at least one of: a groove in the wheel bearing on the contact surface, a groove in the bolt head on the contact surface, a channel in the wheel bearing or a channel in the bolt.

4. The assembly as claimed in claim 2, further comprising:

a flat washer on the contact surface, wherein the compressed-air passage is formed by a groove, a channel or a cutout in the flat washer.

5. The assembly as claimed in claim 2, further comprising:

a spring ring on the contact surface, wherein the compressed-air passage is formed by the undulation of the spring ring.

6. The assembly as claimed in claim 2, wherein part of the wheel bearing, at least part of the bolt and/or at least part of a washer on the contact surface is formed from air-permeable material, wherein the air-permeable material forms the compressed-air passage.

7. The assembly as claimed in claim 6, wherein the air-permeable material is sintered metal, metal foam, porous PTFE form.

8. The assembly as claimed in 1, wherein the compressed-air guide leads from the vehicle-side compressed-air source through clearances between teeth of the toothing system into the wheel bearing annular space.

9. The assembly as claimed in claim 8, wherein the compressed-air guide leads from the vehicle-side compressed-air source to a first annular space, from the first annular space through the clearances between the teeth of the toothing system, from the toothing system into the wheel bearing annular space, and from the wheel bearing annular space to the wheel.

10. The assembly as claimed in claim 9, further comprising:

a wheel carrier which is fastenable on the vehicle, wherein the wheel bearing mounted rotatably on the wheel carrier; and a compressed-air line in and/or on the wheel carrier leading from the vehicle-side compressed-air source to the first annular space.

11. The assembly as claimed in claim 10, wherein the first annular space is formed by the wheel carrier and at least one rotating portion of the assembly formed of the output shaft and/or the wheel bearing, and the first annular space is sealed off with respect to surroundings via a sealing assembly.

12. The assembly as claimed in claim 9, wherein the first annular space is formed by at least one non-rotating portion of the assembly and at least one rotating portion of the assembly, and the first annular space is sealed off with respect to surroundings via a sealing assembly.

13. The assembly as claimed in claim 12, wherein the sealing assembly comprises at least one sealing lip, the sealing lip does not provide a seal and does not abrade in the case of a first pressure in the first annular space, and the sealing lip is movable and provides a seal by virtue of a second, higher, pressure.

14. A method for tire inflation pressure regulation of a vehicle, the method comprising acts of:

providing a compressed-air guide from the vehicle into a tire of the vehicle, wherein the tire is inflatable with air pressure of the compressed-air guide;

measuring an actual pressure in the tire using a sensor in a rotating portion of the vehicle, the rotating portion being one of: a wheel bearing, a wheel or the tire;

wirelessly transmitting the measured actual pressure to a control unit in the non-rotating portion of the vehicle; and actuating a control valve, which is in the rotating portion, in the compressed-air guide, depending on the transmitted actual pressure, into a first switch position for inflating the tire and into a second switch position for letting the compressed air out of the tire, wherein the compressed air is guided from a vehicle-side pressure source through a wheel bearing annular space and through a compressed-air passage to the wheel, a wheel bearing is braced to an output shaft via a bolt, wherein the bolt is arranged coaxially to the output shaft, and the wheel bearing annular space is defined in an interior of the wheel bearing and radially outside the bolt.

15. The method as claimed in claim 14, wherein by varying the pressure in the compressed-air guide depending on the transmitted actual pressure, and pneumatically actuating the control valve by way of the varied pressure, a first pressure brings about the first switch position and a second pressure brings about the second switch position, wherein the second pressure is higher than the first pressure.

16. The method as claimed in claim 15, wherein the control unit compares the transmitted actual pressure with a target pressure and correspondingly actuates the control valve.

17. The method as claimed in claim 14, wherein the control unit compares the transmitted actual pressure with a target pressure and correspondingly actuates the control valve.

18. The method as claimed in claim 14, wherein the compressed air is guided from a vehicle-side pressure source through clearances between teeth of a toothing system to the wheel, and the toothing system is used for transmitting torque from a drive of the vehicle to the wheel.

* * * * *